United States Patent
Adams

(10) Patent No.: US 7,216,668 B1
(45) Date of Patent: May 15, 2007

(54) INTERRUPTION VALVE WITH AUTOMATIC RESET

(76) Inventor: Thomas A. Adams, 629 S. Allen St., San Bernardino, CA (US) 92408

( * ) Notice: Subject to any disclaimer, the term of this patent is extended or adjusted under 35 U.S.C. 154(b) by 290 days.

(21) Appl. No.: 11/015,920

(22) Filed: Dec. 20, 2004

(51) Int. Cl.
F16K 17/32 (2006.01)
(52) U.S. Cl. .................. 137/462; 137/464; 137/494
(58) Field of Classification Search ............... 137/494, 137/462, 464
See application file for complete search history.

(56) References Cited

U.S. PATENT DOCUMENTS

| 745,002 | A | * | 11/1903 | Devers et al. | 137/464 |
| 854,047 | A | * | 5/1907 | Leber | 137/462 |
| 1,615,776 | A | * | 1/1927 | Slater | 137/464 |
| 2,304,404 | A | * | 12/1942 | Flanagan | 137/462 |
| 3,792,714 | A | * | 2/1974 | Miller | 137/494 |
| 5,860,446 | A | * | 1/1999 | Hunt | 137/464 |

* cited by examiner

Primary Examiner—Stephen M. Hepperle
(74) Attorney, Agent, or Firm—Albert O. Cota

(57) ABSTRACT

A fluid valve (10) that interrupts the flow of fluid when backpressure ceases. The valve (10) consists of a valve body (20) having an inlet (22), an outlet (24), a piston chamber (32), and a backpressure port (34). The port (34) is located between the outlet (24) and the chamber (32), and a stem bore (36) is disposed within the valve body (20) between the chamber (32), and the inlet (22) and the outlet (24). A piston (40) that includes a restricting stem (42), is confined within the chamber (32) and the stem (42) is positioned within the stem bore (36). The stem (42) restricts fluid flow when there is no backpressure, but when backpressure exists the stem (42) is forced away from the inlet (22) and the outlet (24) by the piston (40) thereby permitting a full flow through the valve (10). An adjustable compression spring (68) engages the piston (40) urging the stem (42) into the stem bore (36) when no backpressure exists. The valve (10) automatically restores full fluid flow when sufficient fluid backpressure is re-established.

16 Claims, 8 Drawing Sheets

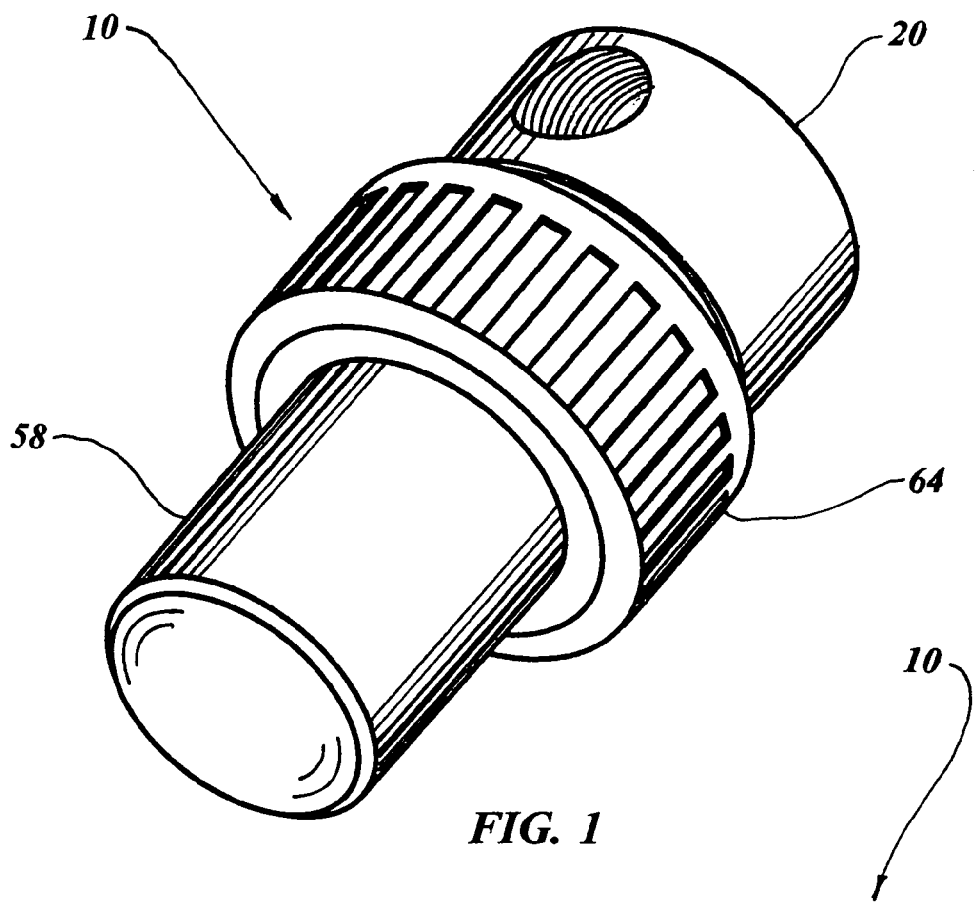
*FIG. 1*
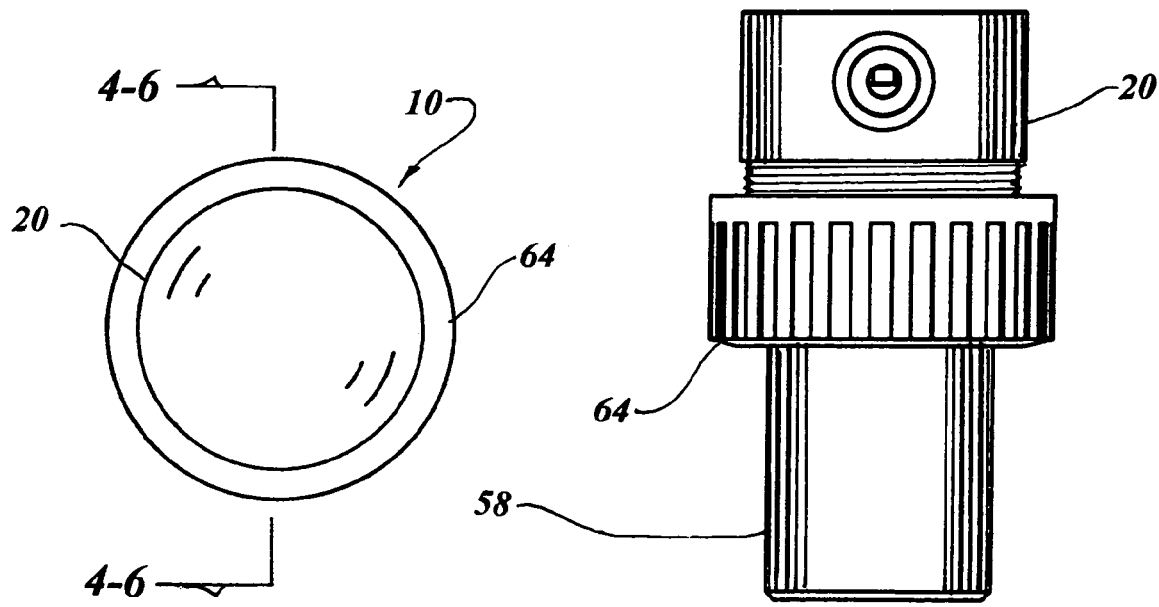
*FIG. 2*   *FIG. 3*

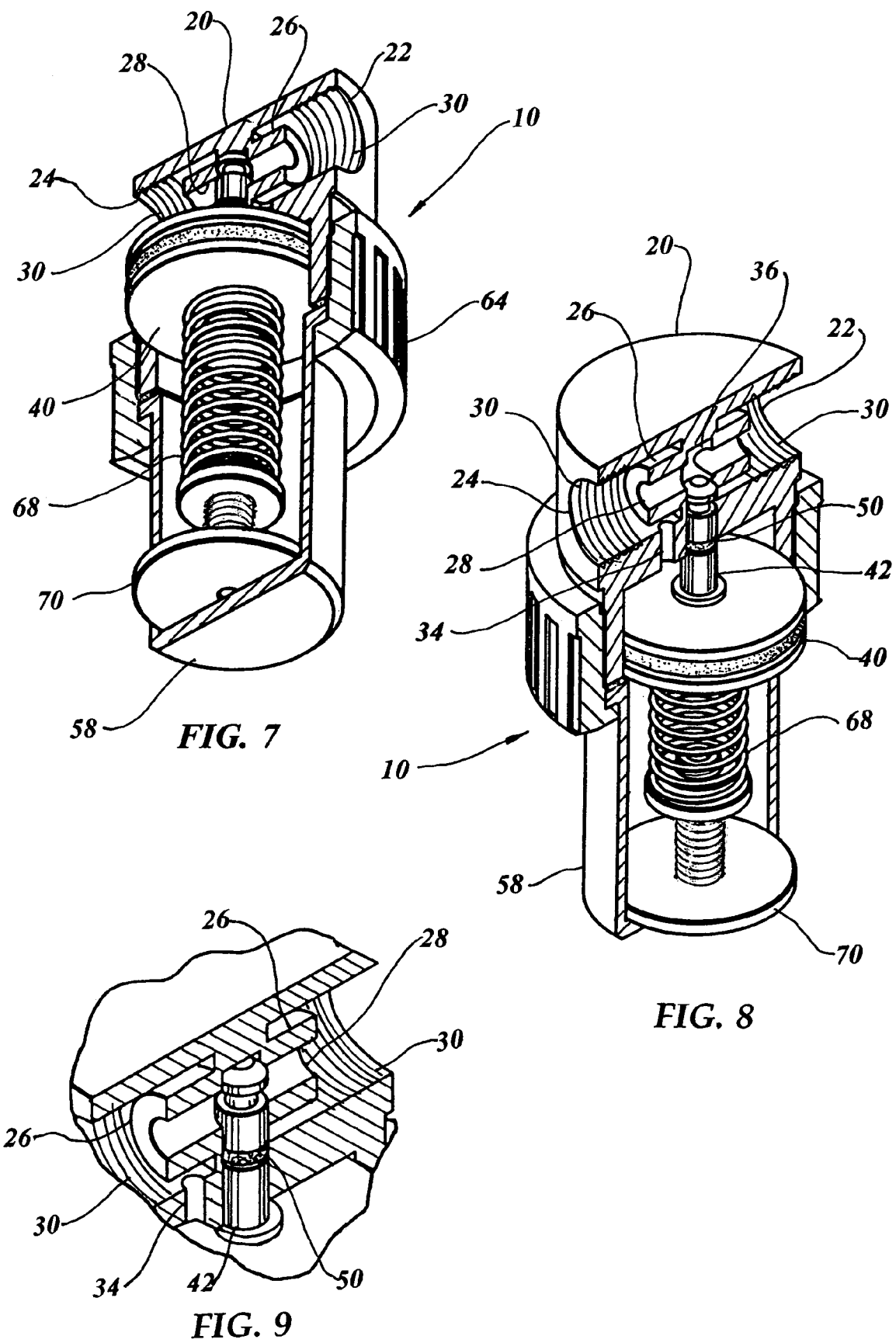

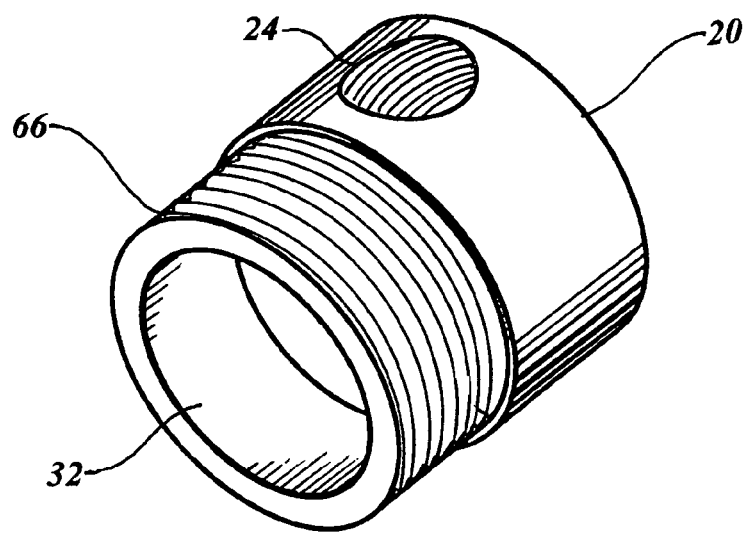
FIG. 10
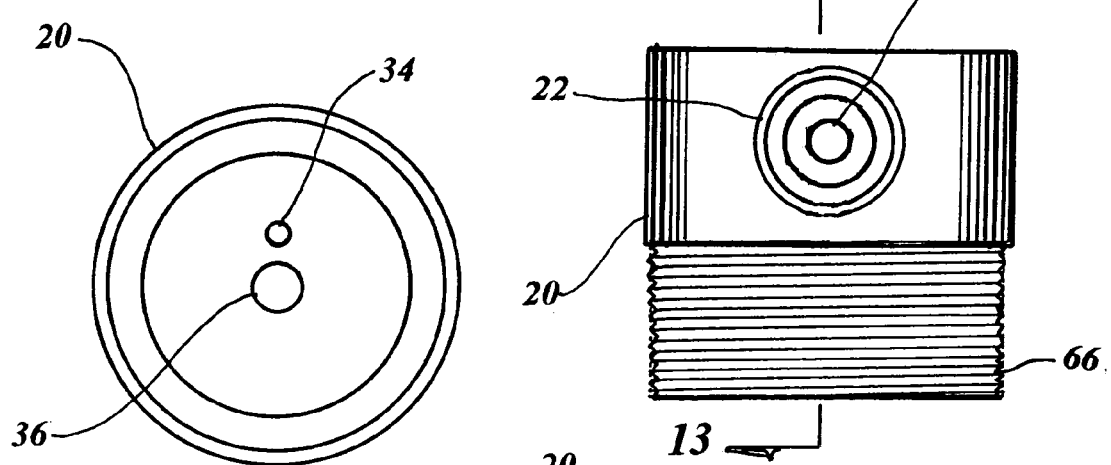
FIG. 11
FIG. 12
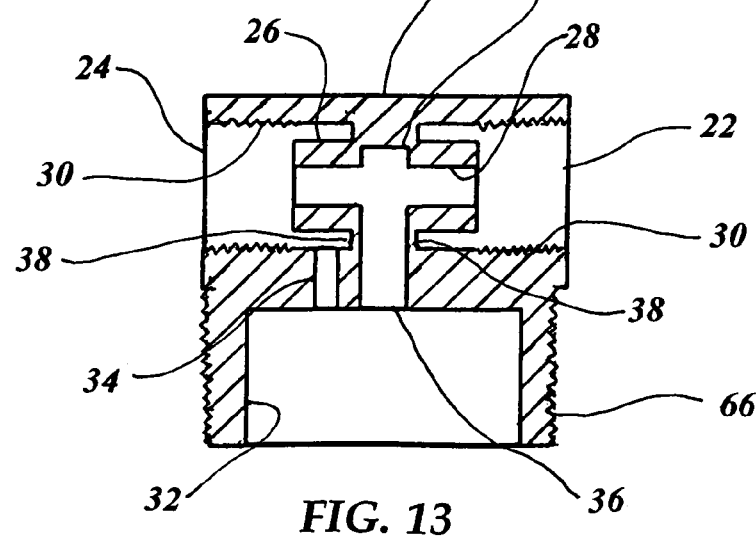
FIG. 13

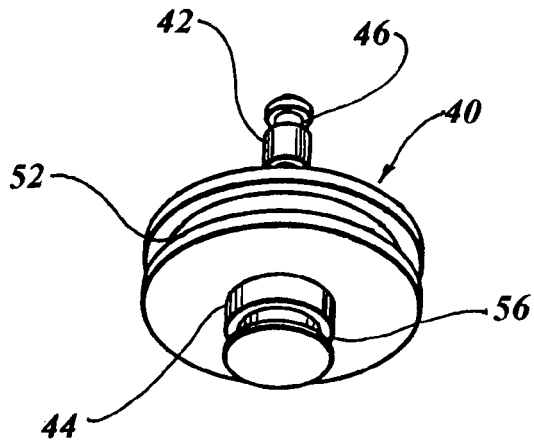
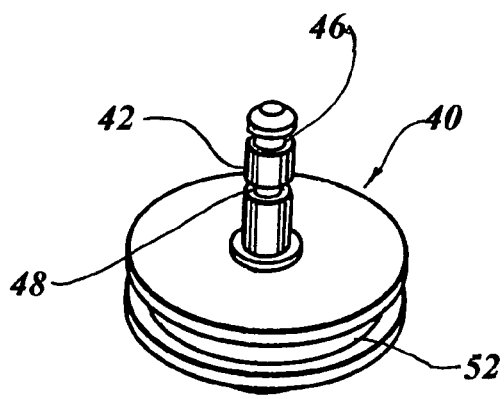
FIG. 14
FIG. 15
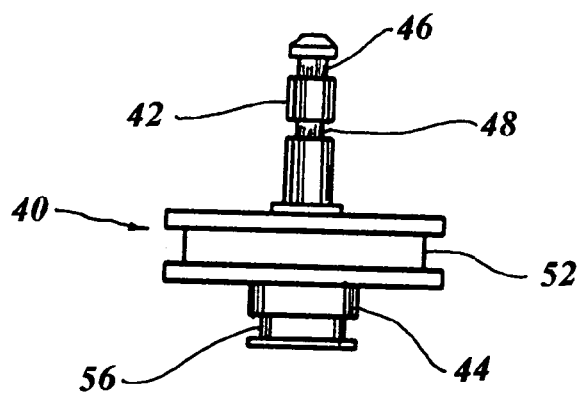
FIG. 16
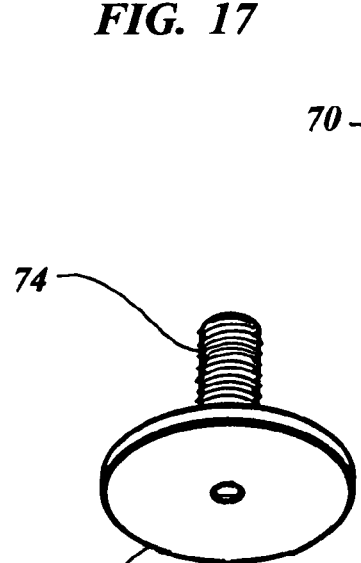
FIG. 17
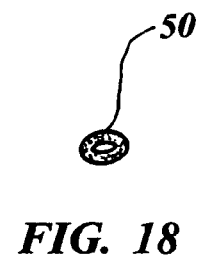
FIG. 18
FIG. 19
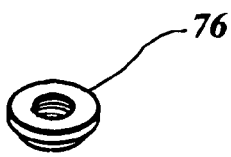
FIG. 20
FIG. 21

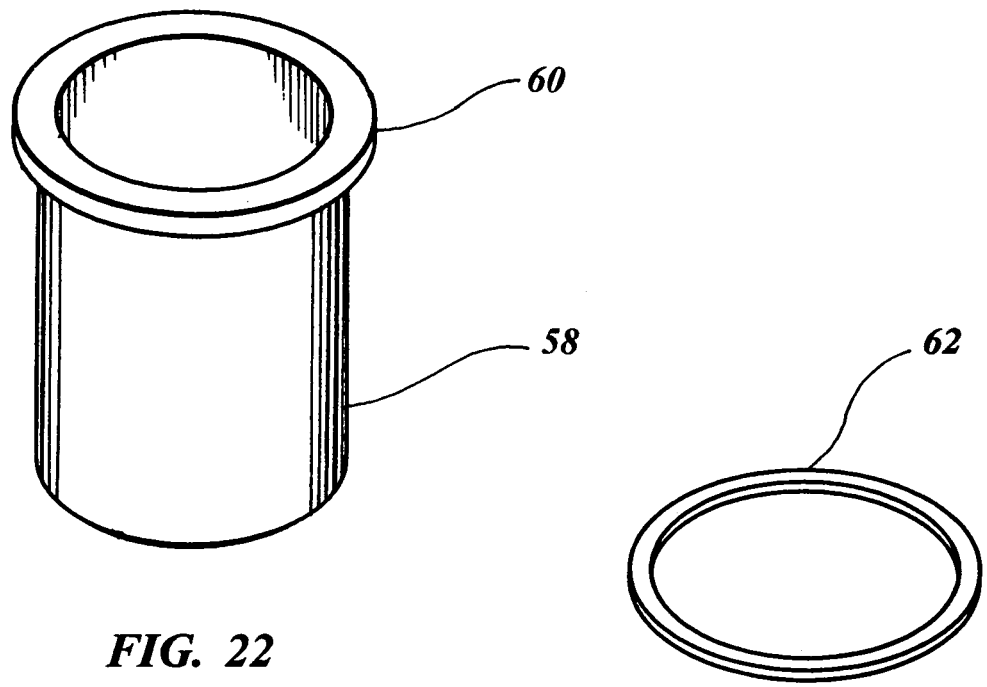
FIG. 22
FIG. 23
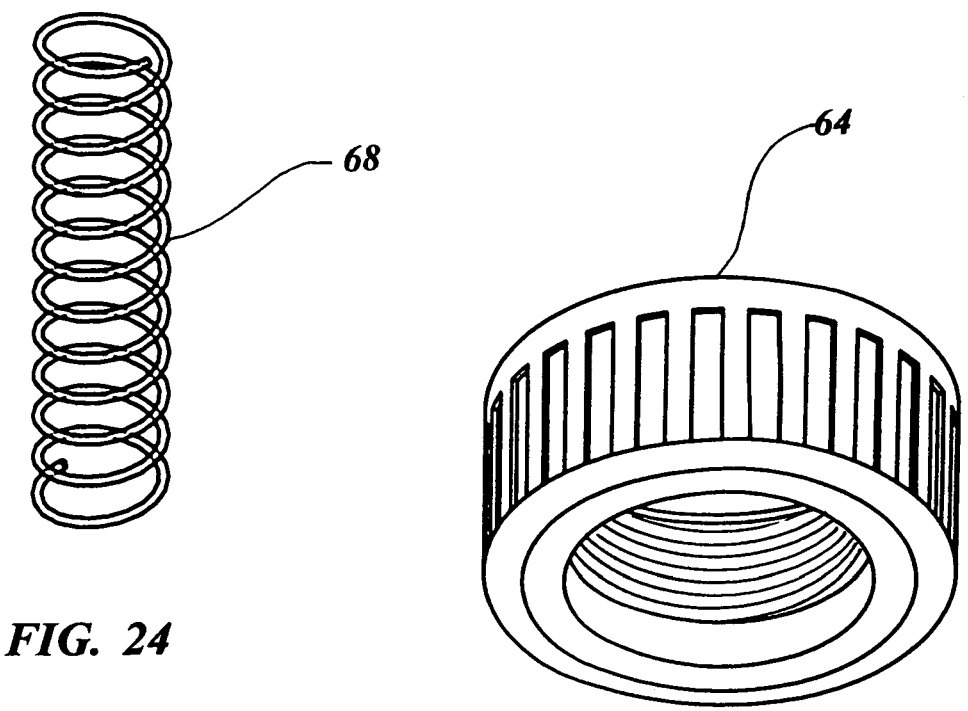
FIG. 24
FIG. 25

INTERRUPTION VALVE WITH AUTOMATIC RESET

TECHNICAL FIELD

The invention generally pertains to fluid control valves, and more specifically to an automatic valve that reduces fluid flow when backpressure is interrupted and that is reset automatically when backpressure is resumed.

BACKGROUND ART

Previously, many types of valves have been used to provide an effective means to control the flow and restriction of a fluid.

The prior art listed below did not disclose patents that possess any of the novelty of the instant invention, however the following U.S. patents are considered related:

| U.S. Pat. No. | Inventor | Issue Date |
| --- | --- | --- |
| 3,050,086 | Honsinger | Aug. 21, 1962 |
| 3,120,243 | Allen et al. | Feb. 4, 1964 |
| 3,630,236 | Diggs | Dec. 28, 1971 |
| 4,437,493 | Okuda et al. | Mar. 20, 1984 |
| 5,373,873 | Miller et al. | Dec. 20, 1994 |
| 5,868,163 | Mc Donald | Feb. 9, 1999 |

Honsinger in U.S. Pat. No. 3,050,086 teaches a fluid control mechanism for delivering a fluid having a substantially constant volumetric flow rate therethrough irrespective of a substantial variation in pressure drop. The application is directed to the domestic washing machine field where substantial variations in water pressure are encountered.

U.S. Pat. No. 3,120,243 issued to Allen et al. relates to pressure responsive valves that are used to stop fluid flow under pressure and to regulate the quantity of fluid under pressure that is allowed to flow into a stream at a given time.

Diggs in U.S. Pat. No. 3,630,236 discloses a continuous mini-flow irrigation device that uses a metering cone inserted through a resilient washer for adjustably metering fluid flow. Full flow is achieved when a cone is fully inserted through a washer which precludes plugging.

Okuda et al. in U.S. Pat. No. 4,437,493 teaches a constant flow control valve with a main flow passage having a variable area controlled by fluid dynamic pressure.

U.S. Pat. No. 5,373,873 issued to Miller et al. is for a gauge block assembly that is used for refilling high pressure gaseous oxygen cylinders. A gas transfer control unit allows rapid evacuation of the spent oxygen cylinder but prevents rapid refilling. A check valve with a restrictive orifice opens or closes for evacuation and refilling.

McDonald in U.S. Pat. No. 5,868,163 discloses a flow control device that is inserted into the valve seat of a tap which has a passage terminating internally into a body. Passages radiate from the body to a peripheral surface and the end face of the body engages the washer of a tap.

For background purposes and as indicative of the art to which the invention is related, reference may be made to the following remaining cited U.S. patents found in the search:

| U.S. Pat. No. | Inventor | Issue Date |
| --- | --- | --- |
| 3,203,629 | Goddard | Aug. 31, 1965 |
| 3,431,944 | Sakuma | Mar. 11, 1969 |

DISCLOSURE OF THE INVENTION

Many conventional fluid flow systems such as commercial and residential lawn sprinklers are unable to control the flow of water in the event of a failure of the piping or the sprinkler head down stream from the main control valve. When this type of failure occurs, the water flows through the break in the line or the malfunctioning head. In most cases where automatic systems are employed they are unattended and the failure may go unnoticed for long periods of time. Not only is the water wasted but the remainder of the system receives only a small amount of water, thus allowing the lawn to become dry and even to die in some extreme circumstances.

Therefore, the primary object of the invention is to solve this long felt need by the addition of an automatic valve that permits a small flow of water to enter the system initially which is able to build up sufficient backpressure to open the valve to a full flow by the use of a piston in a cylinder chamber, with the backpressure working against spring tension. In the event that a failure in the system occurs, the backpressure on the piston is released and the spring returns the piston to an at rest position which reduces the flow to a predetermined minimum. If the system is unattended, the water flow is not completely wasted as only a small amount flows through the break.

An important object of the invention is that the valve operation requires no manual resetting, as when the leak is repaired the valve automatically restores full fluid flow when sufficient fluid backpressure is re-established. This feature allows the valve to be located downstream of the main control valve either underground or above ground. Clogging of the valve is almost eliminated, as its position relative to the main valve would cause the main valve to be clogged first.

Another object of the invention is that the valve is adjustable relative to the amount of backpressure required to open the valve. The column height, line loss, discharge head pressures due to the specific gravity and viscosity of various fluids, is easily compensated for by a simple adjustment of the spring tension on the piston. When the valve is first positioned in the system a simple test may be conducted to gauge whether the retraction time is within the desired limit. The valve is easily disassembled and the spring is adjusted manually by rotating a spring retainer on the threaded adjusting stem.

Still another object of the invention is the ease of installation, as the valve is identified with an inlet and outlet, with each valve having threads capable of receiving a conventional threaded pipe or any other interface according to the application.

Yet another object of the invention is the adaptability of the valve for almost any fluid, as the invention is not limited to water in a sprinkler system but may be employed for a myriad of fluids and media where backpressure is required to be sensed and controlled. While the preferred material for producing the valve for water is thermoplastic, the valve may be made of almost any material such as stainless steel or cupronickel where strength is mandated for high pressures and corrosive media is encountered.

These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 1 is a partial isometric view of the fluid valve in the preferred embodiment for the interruption of fluid flow when backpressure ceases and for automatic reset when backpressure is restored.

FIG. 2 is a top view of the valve in the preferred embodiment.

FIG. 3 is a side view of the valve in the preferred embodiment.

FIG. 7 is a partial cutaway isometric view of the valve in a closed position in the preferred embodiment.

FIG. 8 is a partial cutaway isometric view of the valve in an open position in the preferred embodiment.

FIG. 9 is a fragmentary cutaway isometric view of the valve in the closed position with the piston restricting stem fully extending into the stem bore partially blocking the flow conduit thru-bore.

FIG. 10 is a partial isometric view of the valve body in the preferred embodiment completely removed from the invention for clarity.

FIG. 11 is a bottom view of the valve body in the preferred embodiment completely removed from the invention for clarity.

FIG. 12 is a side view of the valve body in the preferred embodiment completely removed from the invention for clarity.

FIG. 13 is a cross-sectional view taken along lines 13—13 of FIG. 12.

FIG. 14 is a partial bottom isometric view of the valve piston in the preferred embodiment completely removed from the invention for clarity.

FIG. 15 is a partial top isometric view of the valve piston in the preferred embodiment completely removed from the invention for clarity.

FIG. 16 is a side view of the valve piston in the preferred embodiment completely removed from the invention for clarity.

FIG. 17 is a partial isometric view of the piston sealing O-ring in the preferred embodiment completely removed from the invention for clarity.

FIG. 18 is a partial isometric view of the restricting stem sealing O-ring in the preferred embodiment completely removed from the invention for clarity.

FIG. 19 is a top view of the spring tension adjusting spool in the preferred embodiment completely removed from the invention for clarity.

FIG. 20 is a partial isometric view of the disc and integral stem of the spring tension adjusting spool in the preferred embodiment completely removed from the invention for clarity.

FIG. 21 is a partial isometric view of the threaded spring retainer of the spring tension adjusting spool in the preferred embodiment completely removed from the invention for clarity.

FIG. 22 is partial isometric view of the spring housing in the preferred embodiment completely removed from the invention for clarity.

FIG. 23 is partial isometric view of the spring housing gasket in the preferred embodiment completely removed from the invention for clarity.

FIG. 24 is partial isometric view of the compression spring in the preferred embodiment completely removed from the invention for clarity.

FIG. 25 is partial isometric view of the threaded cap in the preferred embodiment completely removed from the invention for clarity.

BEST MODE FOR CARRYING OUT THE INVENTION

Figures 4, 5, 6:
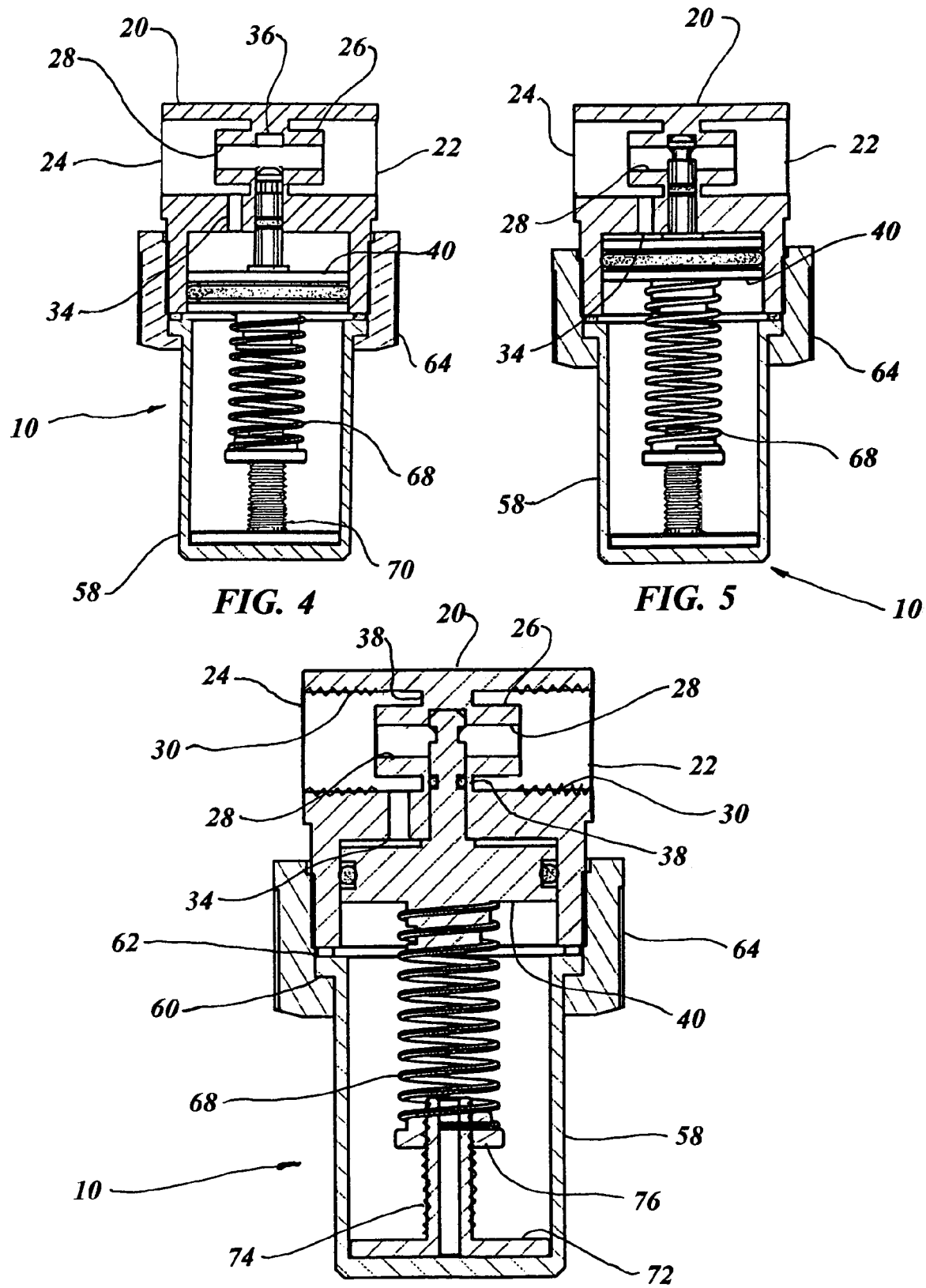
FIG. 4 is a cross-sectional view taken along lines 4—4 of FIG. 2 with the exception of the piston, spring and tension adjusting spool which are shown un-sectioned.
FIG. 5 is a cross-sectional view taken along lines 5—5 of FIG. 2 with the exception of the piston, spring and tension adjusting spool which are shown un-sectioned.
FIG. 6 is a cross-sectional view taken along lines 6—6 of FIG. 2 with the exception of the spring which is shown un-sectioned.

The best mode for carrying out the invention is presented in terms of a preferred embodiment for a fluid valve 10. The fluid valve 10 functions by interrupting fluid flow when backpressure ceases and automatically resets when backpressure is restored. The preferred embodiment of the valve 10, as shown in FIGS. 1 through 27, is comprised of a valve body 20 that has an inlet 22 and an outlet 24, and a flow conduit 26 positioned therebetween. The flow conduit 26 contains a thru-bore 28 which permits fluid communication between the inlet 22 and the outlet 24. The valve body inlet 22 and valve body outlet 24 each preferably contain female pipe threads 30 that are configured to secure conventional threaded pipes, however other types of threads or sockets may be utilized with equal ease for specific types of piping.

The body 20 includes a piston chamber 32 that is located adjacent to the inlet 22 and the outlet 24, as illustrated in FIGS. 4–8, 10, 11 and 13. A backpressure port 34 is positioned between the body outlet 24 and the piston chamber 32, permitting fluid communication therebetween, and a stem bore 36 is disposed within the valve body 20 between the flow conduit 26 and the piston chamber 32, allowing association therebetween.

The valve body flow conduit 26, as shown in FIGS. 4–9 and 27, has a smaller outside diameter than both the valve inlet 22 and the valve outlet 24. The flow conduit 26 jointly protrudes into the valve inlet 22 and valve outlet 24, forming a recess 38 around the conduit that allows communication with another chamber, described later, within the valve body 20 when a pipe is connected onto the outlet 24, as illustrated best well in FIG. 9.

Figure 27:
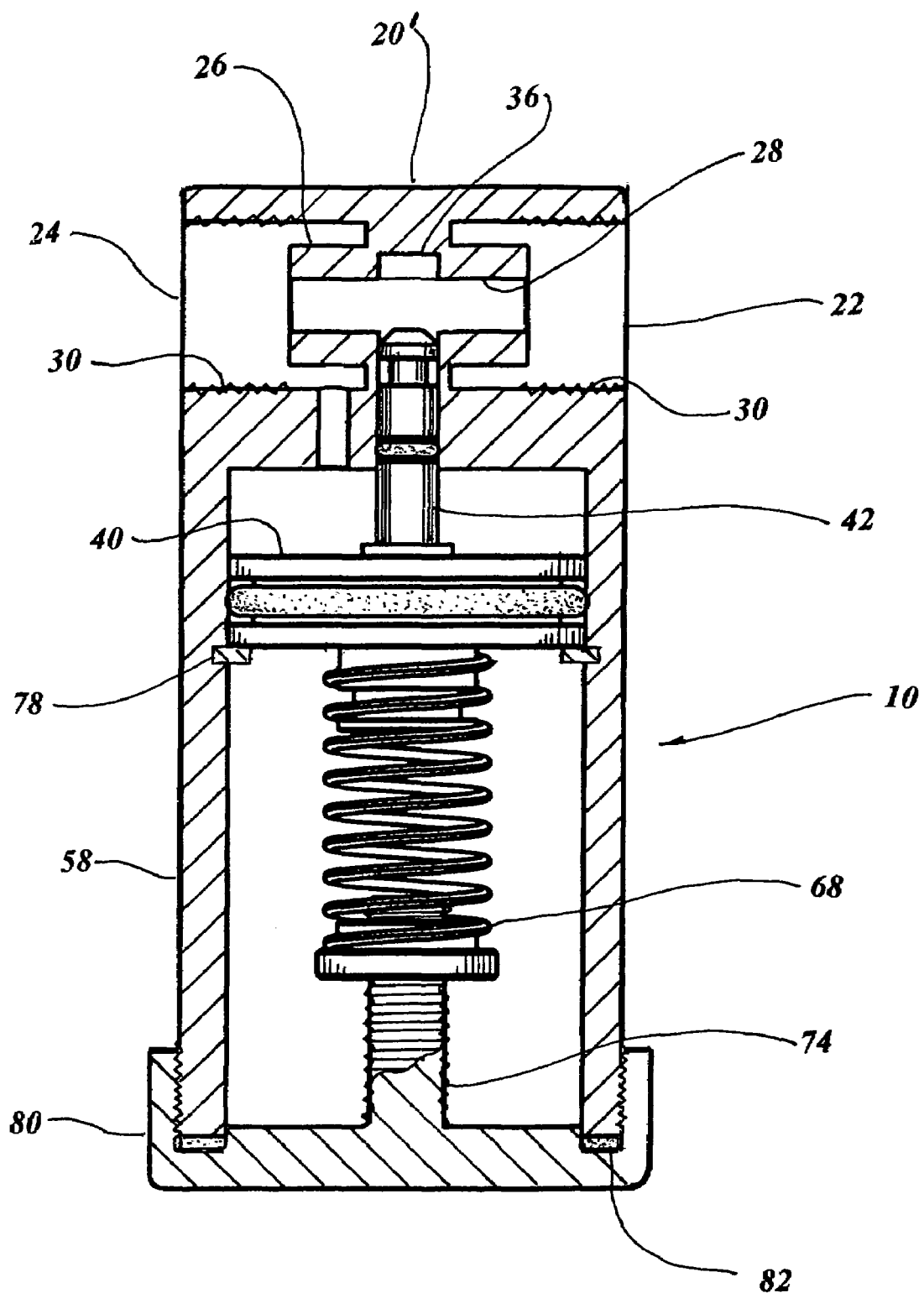
FIG. 27 is a partial cutaway side view of the fluid valve piston in a variation of the preferred embodiment with the valve body having a one piece construction.

As illustrated by itself in FIGS. 14–16, a piston 40 having a restricting stem 42 on a first side and a spring retaining boss 44 on a second side, is slideably confined within the piston chamber 32. The restricting stem 42 is positioned completely within the stem bore 36 such that when no backpressure exists in the fluid flow leaving the outlet 24, the stem 42 restricts the fluid flow through the flow conduit 26. When backpressure occurs within the piston chamber 32 sufficiently to overcome spring pressure on the piston 40, the piston 40 is forced away from the inlet 22 and outlet 24 by the backpressure. The piston restricting stem 42 is then drawn away from the flow conduit 26 since it is an integral part of the piston 40, thus permitting unrestricted full flow through the thru-bore 28 of the flow conduit 26. FIGS. 5–7 and 9 illustrate the piston restricting stem 42 in a closed position and held in place by spring tension. In FIGS. 4, 8 and 27, the valve 10 is depicted in an open position.

The piston restricting stem 42 includes a minimized flow groove 46, as illustrated best in FIGS. 14–16. The flow groove 46 is calibrated in size to permit adequate fluid flow to initially pass through the flow conduit 26 for creating sufficient backpressure to retract the restricting stem 42 from the stem bore 36, thereby permitting full flow operation of the valve 10 under normal flow conditions.

The piston restricting stem 42 further includes a restricting stem circumferential groove 48 therein, with a restricting stem sealing O-ring 50 disposed into the circumferential groove 48 for sealing the stem within the stem bore 36, thereby permitting sealed inward and outward movement. The piston stem sealing O-ring 50 is depicted alone in FIG. 18 and assembled in FIGS. 4–9 and 27.

The piston 40 by itself, is illustrated in FIGS. 14–16 and includes a piston circumferential groove 52 therein with a piston sealing O-ring 54, as shown in FIG. 17, disposed into the circumferential groove 52 for sealing the piston 40 within the piston chamber 32, thereby permitting sealed linear movement.

The piston spring retaining boss 44 further contains a disassembly finger groove 56 therein for enhancing maintenance procedures when manually removing the piston 40 from the piston chamber 32. FIGS. 14 and 16 illustrate the finger groove 56 best, however FIG. 26 also depicts this disassembly feature.

A spring housing 58 is hermetically sealed to the valve body 20, which provides an area for a compressible fluid by creating a dead air space that allows the piston 40 to freely slide within the piston chamber 32. The spring housing 58 sealed to the valve body 20 consists of hollow cylinder with a closed end and an open end, with a flange 60 around the open end, as shown in FIG. 22.

A housing gasket 62 is disposed between the valve body 20 and the flange 60. A spring housing threaded cap 64 interfaces with the flange 60 by rotatably engaging threads 66 on the valve body 20, therefore compressing the gasket 62 between the housing 58 and the valve body 20 to produce a hermetic seal therebetween. The relationship of the flange 60, gasket 62 and threaded cap 64 is illustrated in FIGS. 4–8.

A compression spring 68, which is disposed within the spring housing 58, intimately engages the piston spring retaining boss 44 on a first end and ultimately contacts the spring housing 58 on a second end, as shown in FIGS. 4–8 and 27. The spring 68 urges the piston 40 and henceforth its integral piston restricting stem 42 into the stem bore 36, restricting fluid flow when no backpressure exists, and urges the piston restricting stem 42 away from the flow conduit 26 against spring pressure when sufficient backpressure is created at the valve outlet 24. It should be noted that the compression spring 68 is preferably formed of stainless steel, however other materials may be utilized with equal ease.

Means for adjusting tension on the compression spring 68 for obtaining optimum flow restriction characteristics is defined as a spring tension adjusting spool 70 that is disposed within the spring housing 58. The spring tension adjusting spool 70 consists of a disc 72 having an adjustment stem 74 protruding therefrom for providing adjustment relative to its length. The adjustment stem 74 includes male threads thereon, with a threaded spring retainer 76 rotatably disposed on the adjustment stem 74 for providing the adjustment of the compression on the spring 68 relative to its length. The spool 70, is shown alone in FIG. 19, the disc 72 with its stem 74, is shown in FIG. 20, and the retainer 76 is shown in FIG. 21.

The fluid valve 10 may be formed of injection molded thermoplastic, with the exception of the compression spring 68 which is preferably stainless steel. While thermoplastic is preferred other materials may also be utilized, or a combination of materials such as metal, with the O-ring material selected for compatibility with the type of fluid used in the valve 10.

Figure 26:
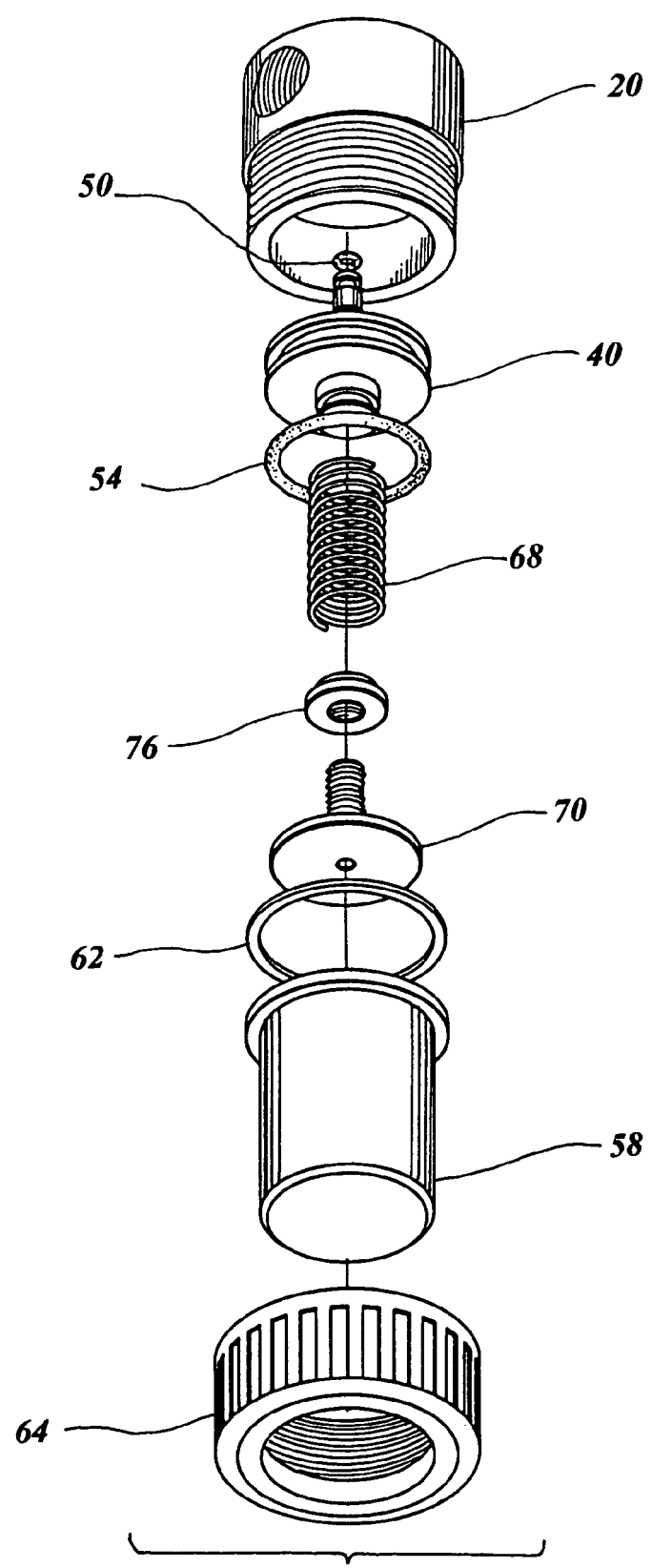
FIG. 26 is an exploded view of the preferred embodiment.

FIG. 26 illustrates a slight variation of the preferred embodiment in that the spring housing 58 is hermetically sealed to the valve body 20 which is formed integrally creating a unitary body 20'. The body 20' utilizes a snap ring 78 that is located slightly beneath the piston 40 in its valve open position for limiting the travel of the piston 40 since the piston chamber 32 extends the full length of the body 20'. The means for adjusting tension on the compression spring 68 consists of a valve body cap 80 removably attached to the distal end of the spring housing 58 that is now integral with the body 20'. The valve body cap 80 has the same adjustable threaded stem 74 and utilizes the same threaded adjustable spring retainer 76. The cap 80 is removable using male threads on the body 20' and female threads on the cap 80, with the hermetic seal accomplished by a cap gasket 82 that is located between the cap 80 and the body 20'.

A method of interrupting fluid flow is also presented which comprises providing a valve 10 having a fluid flow path through a flow conduit 26. Then, when the backpressure is sufficient at a minimal initial fluid flow through the valve flow path, the valve 10 achieves full flow after establishing an adequate fluid backpressure level. Further, the valve 10 restricts fluid flow when the backpressure has been reduced below a minimum fluid backpressure level. The valve 10 automatically restores full fluid flow when sufficient fluid backpressure level has been re-established.

During operation, in either embodiment, the valve 10 is interjected into a fluid line by mechanically connecting the valve 10 into the inlet 22 and the outlet 24. When fluid flow is introduced into the line, the flow groove 46 in the restricting stem 42 permits a limited amount of fluid flow to build up backpressure created by a nozzle or orifice, such as a sprinkler head or the like. When backpressure is sufficient, as sensed through the backpressure port 34 on the outlet 24 of the valve 10, the backpressure overcomes spring compression on the piston 40. The piston 40 is therefore forced to slide within the piston chamber 32 away from the pressure introduced through the backpressure port 34, drawing the restricting stem 42 from the stem-bore 36, thereby permitting full flow through the thru-bore 28 of the flow conduit 26 between the inlet 22 and outlet 24. If the line leaving the valve 10 or the restriction within the line such as a nozzle or sprinkler head breaks and/or leaks, the lack of pressure on the piston 40 permits the piston 40 to be urged upward within the piston chamber 32 by the spring compression, which also forces the restricting stem 42 into the stem bore 36, thus limiting the flow to its initial restriction. The valve 10 automatically restores full fluid flow when sufficient fluid backpressure has been re-established.

While the invention has been described in detail and pictorially shown in the accompanying drawings, it is not to be limited to such details, since many changes and modifications may be made to the invention without departing from the spirit and scope thereof. Hence, it is described to cover any and all modifications and forms which may come within the language and scope of the appended claims.

The invention claimed is:

1. A fluid valve for the interruption of fluid flow when backpressure ceases and automatic resetting when backpressure is restored which comprises:
   a) a valve body having an inlet and an outlet, with a flow conduit positioned therebetween, wherein the flow conduit having a thru-bore within permitting fluid communication between the inlet and the outlet, said body having a piston chamber adjacent to the inlet and the outlet, said body having a backpressure port between the body outlet and the piston chamber permitting fluid communication therebetween, said body having a stem bore disposed within the valve body between the flow conduit and the piston chamber permitting association therebetween, b) a piston having a restricting stem on a first side and a spring retaining boss on a second side slideably confined within said piston chamber, with the restricting stem positioned completely within said stem bore, when no backpressure in the flow leaving the outlet exists, fluid flow is restricted through the flow conduit, and when sufficient backpressure exists the piston stem is automatically forced away from the flow conduit by the piston permitting full flow therethrough, c) a spring housing hermetically sealed to said valve body providing an area for compressible fluid, said area defined as a dead air space, d) a compression spring disposed within said spring housing intimately engaging said piston spring retaining boss on a first end, and in contact with said spring housing on a second end, for urging the piston with its piston restricting stem into the stem bore, restricting fluid flow when no backpressure exists, and urging the piston restricting stem away from the flow conduit against spring pressure when sufficient backpressure is created at the valve outlet, e) means for adjusting tension on said compression spring for obtaining optimum flow restriction characteristics.

2. The fluid valve as recited in claim 1 wherein said valve body inlet and said valve body outlet each further comprise a plurality of female threads configured to secure a threaded pipe.

3. The fluid valve as recited in claim 1 wherein said valve body flow conduit having a smaller outside diameter than both said valve inlet and valve outlet.

4. The fluid valve as recited in claim 1 wherein said valve body flow conduit jointly protrudes into said valve inlet and said valve outlet, forming a recess around said conduit, therefore precluding said backpressure port from being covered when a pipe is connected onto said outlet.

5. The fluid valve as recited in claim 1 wherein said piston restricting stem further having a minimized flow groove calibrated in size to permit adequate flow to initially pass through said flow conduit, which permits sufficient backpressure to retract the stem from the stem bore, thereby achieving full flow operation.

6. The fluid valve as recited in claim 1 wherein said piston further having a piston circumferential groove therein, with a piston sealing O-ring disposed into the piston circumferential groove for sealing into said piston chamber, thereby permitting sealed linear movement.

7. The fluid valve as recited in claim 1 wherein said piston restricting stem further having a restricting stem circumferential groove therein, with a restricting stem sealing O-ring disposed into the restricting stem circumferential groove for sealing the stem with said stem bore, thus permitting sealed inward and outward movement.

8. The fluid valve as recited in claim 1 wherein said piston spring retaining boss having a disassembly finger groove therein for enhancing maintenance procedures when manually removing the piston from the piston chamber.

9. The fluid valve as recited in claim 1 wherein said spring housing further comprises a hollow cylinder with a closed end and an open end.

10. The fluid valve as recited in claim 9 wherein said spring housing hermetically scaled to said valve body further comprises:

said valve body having a plurality of threads on an end adjacent to said piston chamber, said spring housing having a flange around said open end, a housing gasket disposed between said valve body and said flange on the spring housing, and a spring housing threaded cap engaging the flange on the spring housing, rotatably engaging the as on the valve body, therefore compressing the gasket between the housing and the valve body to produce a hermetic seal therebetween.

11. The fluid valve as recited in claim 1 wherein said compression spring is formed of stainless steel.

12. The fluid valve as recited in claim 1 wherein said means for adjusting tension on said compression spring further comprises a spring tension adjusting spool disposed within said spring housing.

13. The fluid valve as recited in claim 12 wherein said spring tension adjusting spool further comprises a disc having an adjustment stem protruding therefrom for providing adjustment relative to the length of the spring.

14. The fluid valve as recited in claim 12 wherein said adjustment stem further comprising a plurality of threads thereon and a threaded spring retainer rotatably disposed upon said adjustment stem for providing adjustable compression of said spring relative to its length.

15. The fluid valve as recited in claim 1 is formed of injection molded thermoplastic with the exception of the compression spring.

16. The fluid valve as recited in claim 1 wherein said spring housing hermetically scaled to said valve body is formed integrally therewith which forms a unitary body, the body having a snap ring therein for limiting the travel of the piston within the piston chamber, and said means for adjusting tension on said compression spring further comprising a valve body cap removably attached to a distal end of the integral spring housing, the cap having a threaded stem and a threaded adjustable spring retainer.

* * * * *